United States Patent [19]

Schopper et al.

[11] Patent Number: 4,472,941
[45] Date of Patent: Sep. 25, 1984

[54] TANDEM BRAKE MASTER CYLINDER

[75] Inventors: Bernd Schopper, Hattersheim; Wilhelm Ernst, Frankfurt am Main, both of Fed. Rep. of Germany

[73] Assignee: ITT Industries, Inc., New York, N.Y.

[21] Appl. No.: 274,040

[22] Filed: Jun. 15, 1981

[30] Foreign Application Priority Data

Jul. 31, 1980 [DE] Fed. Rep. of Germany ....... 3029015

[51] Int. Cl.³ ........................................... B60T 11/20
[52] U.S. Cl. ....................................... 60/562; 60/584; 60/591
[58] Field of Search ................. 60/561, 562, 582, 591, 60/584; 92/79

[56] References Cited

U.S. PATENT DOCUMENTS

| | | | |
|---|---|---|---|
| 2,524,544 | 10/1950 | Seawell | 60/584 |
| 2,999,362 | 9/1961 | Kinoshita | 60/584 |
| 3,431,729 | 3/1969 | Randel | 60/561 |
| 3,522,706 | 8/1970 | Bueler | 60/562 |
| 3,686,864 | 8/1972 | Shutt | 60/561 |
| 4,024,712 | 5/1977 | Takeuchi | 60/591 |
| 4,175,392 | 11/1979 | Morimoto | 60/561 |
| 4,319,456 | 3/1982 | Kubota | 60/562 |
| 4,356,694 | 11/1982 | Koshimizu | 60/561 |

Primary Examiner—Abraham Hershkovitz
Attorney, Agent, or Firm—James B. Raden; Marvin M. Chaban

[57] ABSTRACT

A tandem brake master cylinder comprising a longitudinal bore having two pressure chambers therein each associated with a different one of two pressure pistons, each of the two pressure chambers and its associated one of the two pressure pistons are associated with a different one of two brake circuits. Two parallel inlet sockets are provided in the housing of the tandem master cylinder, each of the two inlet sockets connecting a different one of the two pressure chambers to a brake fluid reservoir. A transverse bore is also provided in the housing of the tandem master cylinder containing a pressure control device for one of the two brake circuits, the control device including a stepped piston and a valve controlled by the stepped piston. The transverse bore intersects a plane containing the axes of the two inlet sockets in an approximate perpendicular manner between the two inlet sockets and beween the longitudinal bore and the reservoir. This construction provides a space-saving arrangement which enables ease of assembly.

4 Claims, 3 Drawing Figures

TANDEM BRAKE MASTER CYLINDER

BACKGROUND OF THE INVENTION

The present invention relates to a brake master cylinder comprising housing having a longitudinal bore with a pressure chamber and an associated pressure piston; a transverse bore to house a pressure control device, the transverse bore having a stepped piston and a valve controlled thereby; a mounting flange adjacent one end of the longitudinal bore; and a reservoir arranged above the longitudinal bore.

A brake master cylinder of this type is known, for example, from British Pat. No. 1,030,781, whose housing has a first outlet socket for the connection of a brake line leading to the front wheel cylinders, the first outlet socket being located at the end of the longitudinal bore which faces the mounting flange. Above the longitudinal bore, on the side of the reservoir which is facing the mounting flange, a transverse bore is provided to house the pressure control device, the axis of which transverse bore extends vertically and intersects the axis of the longitudinal bore. At the upper end of this transverse bore, there is a second outlet socket for connecting a brake line which leads to the rear wheel cylinders. By placing the assembly of the pressure control device in the housing of the master cylinder, this construction has the advantage of not needing any connection line between the master cylinder and the pressure control device. Thus, it will not be necessary to provide any special assembly space, or any means for fastening the pressure control device to the vehicle. This will facilitate assembly.

Further, a tandem master cylinder is known (Teves "Bremsen-Handbuch"-Teves Brake Handbook-1977; page 45) wherein the longitudinal bore has two pressure chambers each associated with a different one of two pressure pistons each of which are associated with a different one of two brake circuits and wherein two parallel inlet sockets each connect a different one of the two pressure chambers with the mounted reservoir. In this arrangement, the reservoir virtually extends over the entire length of the longitudinal bore. If a pressure control device is to be used with this tandem master cylinder, the pressure control device will have to be mounted separately with respect to the tandem master cylinder.

SUMMARY OF THE INVENTION

It is an object of the present invention to provide a built-in pressure control device in a tandem master cylinder and thereby achieve the above-mentioned advantages of a built-in pressure control device for a tandem master cylinder.

A feature of the present invention is the provision of a tandem brake master cylinder comprising: a housing having a longitudinal bore therein, the longitudinal bore having two pressure chambers therein each associated with a different one of two pressure pistons disposed in the longitudinal bore, each of the two pressure chambers and its associated one of the two pressure pistons being associated with a different one of two brake circuits; two parallel inlet sockets disposed in the housing, each of the two inlet sockets connecting a different one of the two pressure chambers to a brake fluid reservoir disposed outside of the housing; and a transverse bore disposed in the housing accommodating therein a pressure control device for one of the two brake circuits, the control device including a stepped piston and a valve controlled by the stepped piston, the transverse bore intersecting a plane containing the axes of the two inlet sockets in a perpendicular manner between the two inlet sockets and between the longitudinal bore and the reservoir.

This construction does not only feature an arrangement of the pressure control device within the housing of the tandem master cylinder; it also requires hardly any extra space since in the longitudinal direction some space is available between the inlet sockets while the transverse bore will not have to extend in the transverse direction at all, or only slightly beyond the width dimension of the reservoir. Further, as compared with the length of the housing, the distance of the transverse bore from the mounting flange is small. Thus, the torque caused by the additional weight of the pressure control device will be so small that at the maximum there will result only a small additional stress on the entire device as compared with a normal tandem master cylinder. Furthermore, the transverse bore is situated approximately above one pressure chamber. Thus, a short channel will suffice for the communication with the inlet chamber of the pressure control device. As a rule, the tandem master cylinder will also not need its own bleeding system. Since the pressure control device is situated on an elevated level it will be possible for the air to escape via the pressure control device and to be discharged via the bleeding devices of the wheel brake cylinders. In a preferred embodiment the transverse bore is arranged in about the same plane as a stop screw for a pressure piston, the inlet chamber of the pressure control device is arranged approximately above the longitudinal bore, and a bore extending the length of the bore containing the stop screw will connect one pressure chamber with the inlet chamber of the pressure control device. This will facilitate the manufacture since a bore which would have to be manufactured anyhow simply must be lengthened. If in this construction the lengthened bore has to extend at an angle with respect to the vertical, this will be of no importance for the functioning of the stop screw.

It will further be advantageous for the transverse bore to accommodate an emergency piston whose one end face defines the inlet chamber of the pressure control device for one brake circuit and whose other end face defines a pressure space connected with the other brake circuit, the emergency piston automatically keeping the valve of the pressure control device open upon a failure of the other brake circuit. This emergency piston will prevent the pressure reduction in the one brake circuit in a known manner upon a failure of the other brake circuit.

The available length of the transverse bore normally will suffice without any difficulties for the accommodation of both the stepped piston and the emergency piston. Above all, in this construction, the automatic result will be that the inlet chamber of the pressure control device will lie approximately above the longitudinal bore.

In this construction, it is recommended that a longitudinal channel closed at the ends be provided for communication of the pressure space in the transverse bore with the associated pressure chamber in the longitudinal bore, the longitudinal channel communicating with an extension of an outlet channel which leads from the associated pressure chamber to an outlet socket and with a transverse channel closed at the ends, extending near the transverse bore, and followed by a side channel which penetrates the pressure space. The desired communication will be achieved by means of only a few bores which are easily made. Further, no changes will have to be made at the tandem master cylinder.

The free end of the side channel may either be closed or constructed as a outlet socket. In the latter case there will exist a possibility of directly connecting the two wheel cylinders of the associated brake circuit to the housing of the tandem master cylinder.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
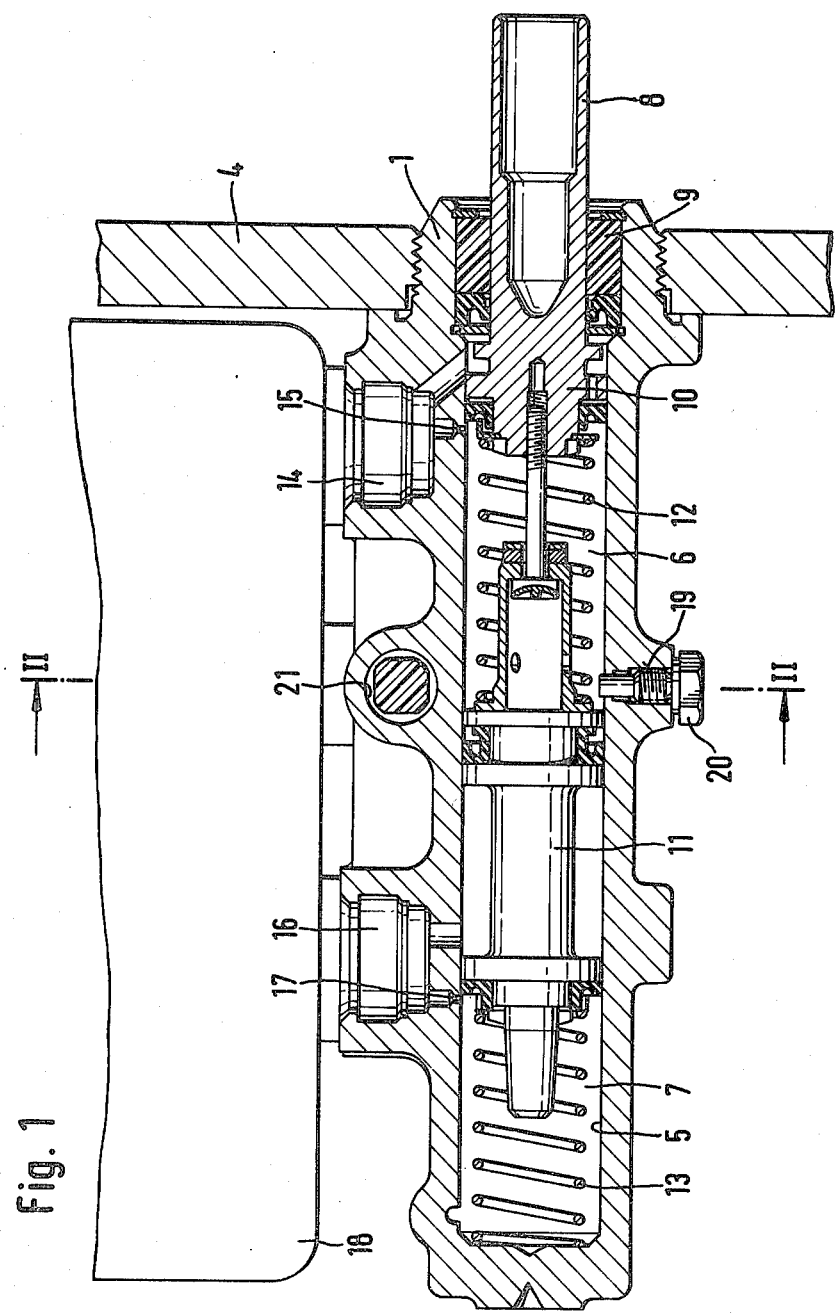
FIG. 1 is a longitudinal cross sectional view of a tandem master cylinder in accordance with the principles of the present invention taken along line I—I of FIG. 2, the reservoir being placed on top thereof.

Referring to the drawing, the tandem master cylinder has a housing 1 whose flange 2 (FIG. 2) may be fastened to a wall 4 by means of screws penetrating holes 3. Housing 1 has a longitudinal bore 5 including a first pressure chamber 6 for a rear wheel brake circuit and a second pressure chamber 7 for a front wheel brake circuit. A shaft 8 penetrates an inlet seal 9 formed by several parts and carries a first pressure piston 10. Shaft 8 may be connected with a brake pedal or a booster device. Between the two pressure chambers 6 and 7, there is a second pressure piston 11. The two pistons are loaded by return springs 12 and 13, respectively. In the rest position, pressure chamber 6 communicates with a mounted reservoir 18 for the brake fluid via an inlet socket 14 and a compensating bore 15. Pressure chamber 7 communicates with reservoir 18 via an inlet socket 16 and a compensating bore 17. A radial bore 19 serves for the accommodation of the stop screw 20 limiting the movement of pressure piston 11 to the right in the drawing. Since such a tandem master cylinder is known there will be no further detailed description.

Figure 2:
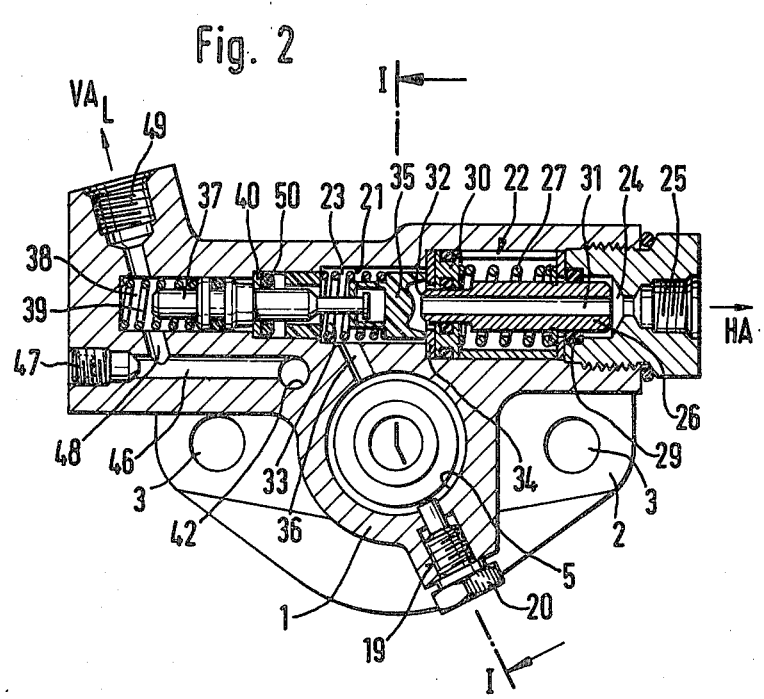
FIG. 2 is a transverse cross sectional view taken along line II—II of FIG. 1.
Figure 3:
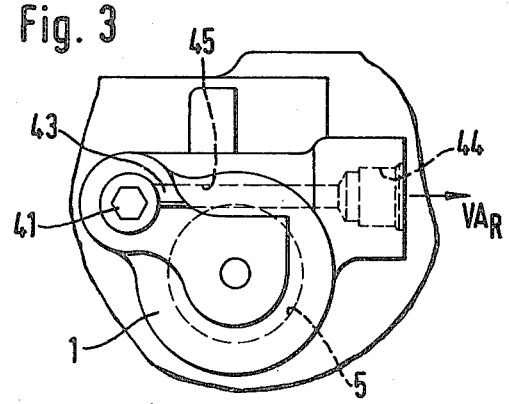
FIG. 3 is a partial end view from the left-hand end of FIG. 1.

Above longitudinal bore 5, there is a transverse bore 21 between inlet sockets 14 and 16 as well as between longitudinal bore 5 and reservoir 18. Transverse bore 21 is stepped and intersects the vertical plane containing the axes of inlet sockets 14 and 16 in a perpendicular manner. As best seen in FIG. 2, transverse bore 21 mainly serves to accommodate a pressure control device 22. To this end, a stepped piston 26 loaded by a spring 27 is provided between an inlet chamber 23 and an outlet chamber 24 which directly communicates with an outlet socket 25 for the connection to the rear wheel brake circuit HA. A seal 29 seals piston 26 relative to outlet chamber 24 and a seal 30 seals piston 26 with respect to inlet chamber 23. Stepped piston 26 is penetrated by a bore 31 forming a valve seat 32 on the end thereof adjacent inlet chamber 23. Valve seat 32 may cooperate with a closure member 35 pressed by a spring 33 against a supporting plate 34. The edge of member 35 having contact with supporting plate 34 permits the passage of brake fluid. Inlet chamber 23 communicates with pressure chamber 6 via a bore section 36 representing an extension of bore 19.

On the opposite side of inlet chamber 23 there is an emergency piston 37 likewise constructed as a stepped piston. The smaller diameter portion of piston 37 protruding from a seal 50 is exposed to the pressure in inlet chamber 23 and the larger diameter portion of piston 37 is exposed to the pressure in a pressure space 38. Further, emergency piston 37 is loaded by a spring 39. Piston 37 will thus normally rest against a stop 40 in the illustrated position. Pressure space 38 communicates with pressure chamber 7 in the following manner. One end of a longitudinal channel 42 closed by a screw 41 at the other end thereof communicates with the extension 43 of an outlet channel 45 leading from the pressure chamber 7 to an outlet socket 44. Outlet socket 44 may be connected with the brake line of a front wheel brake cylinder $VA_R$. The other end of longitudinal channel 42 communicates with a transverse channel 46 closed by a screw 47 at one end thereof. A side channel 48 branches off from transverse channel 46, passing through pressure space 38 and forming an outlet socket 49 at its open end which serves for the connection of the brake line leading to the other front wheel cylinder $VA_L$. All these bores can be easily manufactured.

When shaft 8 of the tandem master cylinder is moved inwards the front wheel cylinders directly communicating with pressure chamber 7 will receive a pressure continuously increasing along with the movement of shank 8, while, after a predetermined pressure level is reached, the rear wheel cylinders communicating with pressure chamber 6 via pressure control device 22 will then be pressurized but with a pressure which will increase at a slower rate. Upon failure of a brake circuit associated with pressure chamber 7 there will also be no pressure in pressure space 38. Emergency piston 37 will move to the left in the drawing, permanently keeping closure member 35 at a distance from valve seat 32. In this case, the rear wheel cylinders will receive a pressure increasing continuously along with the movement of shaft 8. A bleeding device is not necessary for the tandem master cylinder since the air accumulating in the pressure chambers may escape via the outlet sockets 25 and 49 and may then be discharged via the bleeding devices at the wheel brake cylinders.

While we have described above the principles of our invention in connection with specific apparatus, it is to be clearly understood that this description is made only by way of example and not as a limitation to the scope of our invention as set forth in the objects thereof and in the accompanying claims.

We claim:

1. A tandem brake master cylinder comprising:
   a housing having a longitudinal bore therein, said longitudinal bore having two axially aligned pressure chambers therein each associated with a different one of two pressure pistons disposed in said longitudinal bore, each of said two pressure chambers and its associated one of said two pressure pistons being associated with a different one of two brake circuits;
   two parallel inlet sockets disposed in said housing, each of said two inlet sockets connecting a different one of said two pressure chambers to a brake fluid reservoir disposed externally of said housing; the invention comprising a transverse bore disposed in said housing with the axis of said transverse bore generally parallel to and transverse to the axis of said axially aligned chambers, said transverse bore accommodating therein a pressure control device for one of said two brake circuits, said control device including a stepped piston and a valve controlled by said stepped piston, said transverse bore intersecting a plane containing the axes of said two inlet sockets in a perpendicular manner intermediately between said two inlet sockets with said transverse bore intermediate between the axis of said longitudinal bore and said reservoir and spaced above said longitudinal bore, a mounting flange secured to said housing adjacent one end of said longitudinal bore and wherein the axis of said transverse bore is disposed in approximately a common plane with the axis of a stop screw in said housing for the one of said two pressure pistons associated with the other of said two brake circuits, said transverse bore having disposed therein an inlet chamber for said control device disposed approximately above said longitudinal bore to enable the bleeding of air from the longitudinal bore, and a third bore disposed in said housing as an extension of a fourth bore disposed in said housing containing said stop screw, said third bore connecting one of said two pressure chambers associated with said one of said two brake circuits with said inlet chamber.

2. A master cylinder according to claim 1, further including
an emergency piston disposed in said transverse bore, said transverse bore having one end surface defining said inlet chamber and the other end surface defining a pressure space connected with said other of said two brake circuits, and in which said emergency piston is automatically responsive upon failure of said other of said two brake circuits for keeping said valve open.

3. A master cylinder according to claim 2, wherein said pressure space communicates with said other of said two pressure chambers associated with said other of said two brake circuits by an extension of an outlet channel connected between said other of said two pressure chambers and an outlet socket, a longitudinal channel disposed in said housing adjacent to and parallel to said longitudinal bore, said channel having one end closed and the other end connected to said extension, a transverse channel disposed in said housing adjacent to and parallel to said transverse bore having one end closed and the other end connected to said longitudinal channel and a branch channel having one end connected to said transverse channel and a portion thereof connected to said pressure space.

4. A master cylinder according to claim 3, wherein said branch channel extends beyond said pressure space and has an outlet socket provided on the other end thereof adjacent the periphery of said housing.

* * * * *